United States Patent [19]
Corte et al.

[11] 3,882,053
[45] May 6, 1975

[54] ANION EXCHANGE RESINS

[75] Inventors: Herbert Corte, Opladen; Harold Heller, Cologne; Otto Netz, Leverkusen, all of Germany

[73] Assignee: Bayer Aktiengesellschaft

[22] Filed: July 1, 1974

[21] Appl. No.: 484,393

Related U.S. Application Data

[63] Continuation of Ser. No. 313,534, Dec. 8, 1972, abandoned.

[30] Foreign Application Priority Data

Dec. 11, 1971 Germany............................ 2151628
Apr. 1, 1972 Germany............................ 2215956

[52] U.S. Cl. .......................... 260/2.1 E; 260/88.2 S
[51] Int. Cl. ............................................ C08f 27/08
[58] Field of Search ................................. 260/2.1 E

[56] References Cited
UNITED STATES PATENTS

| | | | |
|---|---|---|---|
| 3,006,866 | 10/1961 | Corte et al............................ | 260/2.1 |
| 3,316,186 | 4/1967 | Geyer et al. ........................... | 260/2.1 |
| 3,405,091 | 10/1968 | Sprengling et al.................... | 260/47 |

FOREIGN PATENTS OR APPLICATIONS

| | | |
|---|---|---|
| 134,980 | 10/1902 | Germany |
| 1,168,080 | 4/1964 | Germany |

OTHER PUBLICATIONS

Olah, Friedel–Crafts and Related Reactions, Vol. I, Interscience, New York, 1963 (pp. 32-33, 50-51, 626 and 695).

Olah, Friedel–Crafts and Related Reactions, Vol. II, Interscience, New York, 1964 (pp. 477–478 and 534–535).

Flory, Principles of Polymer Chemistry, Cornell Univ. Press, Ithica, New York, 1953 (pp. 75–78 and 102–103).

*Primary Examiner*—Melvin Goldstein
*Attorney, Agent, or Firm*—Connolly and Hutz

[57] ABSTRACT

Process comprising condensing a crosslinked copolymer which contains aromatic nuclei and is a copolymer of at least one monovinyl compound and at least one polyvinyl compound, with at least one bis-(dicarbonimidoalkyl)ether in the presence of a Friedel-Crafts catalyst, hydrolyzing resulting condensation product and optionally alkylating the hydrolyzed product and the resulting exchange resin.

15 Claims, No Drawings

ANION EXCHANGE RESINS

CROSS-REFERENCE TO RELATED APPLICATION

This application is a continuation of application Ser. No. 313,534 filed Dec. 8, 1972 and now abandoned.

It is known from German Pat. Specification Nos. 1,054,715 and 1,168,080 that synthetic resins with anion-exchanging properties can be obtained by condensing crosslinked, insoluble organic polymers containing aromatic nuclei with an N-haloalkyl imide in the presence of Friedel-Crafts catalysts and swelling agents, and hydrolysing the compounds thus obtained. It is also known from German Pat. No. 134,980 that amino alkyl groups can be introduced into low molecular weight aromatic compounds with the aid of bis-(dicarbonimidoalkyl)-ethers in the presence of sulphuric acid. If the process, described in this German Pat. No. 134,980, is applied to cross linked aromatic polymers, hardly any conversion is obtained.

It has now been found that synthetic resins with anion-exchanging properties can be obtained by condensing crosslinked copolymers, containing aromatic nuclei, of monovinyl and polyvinyl compounds with a bis-(dicarbonimidoalkyl)-ether in the presence of swelling agents and Friedel-Crafts catalysts, hydrolysing the reaction products thus obtained and then optionally subjecting them to alkylation.

The condensation is thought to introduce dicarbonimido alkyl groups into the aromatic nuclei present in the copolymer. The imido ring is then hydrolysed to give an amino group. It is, of course, the amino group which has the anion exchanging properties. If desired the amino group can be alkylated, leading to N-alkylated compounds.

The process according to the invention has considerable advantages over the use of haloalkyl imides. For example, the ethers unlike the haloalkyl compounds are not readily hydrolysable do not give off any gaseous hydrogen halides during condensation and thus avoid the corrosion phenomena caused by hydrogen halides.

Furthermore, it has been found that the process according to the invention gives anion exchangers of greater capacity than those obtained in cases where the corresponding N-haloalkyl imides are used.

It has also been found that the reaction of crosslinked copolymers, containing aromatic nuclei, of monovinyl and polyvinyl compounds with bis-(dicarbonimidoalkyl)-ethers in the presence of swelling agents and Friedel-Crafts catalysts can be carried out with advantage in the presence of small quantities of hydrogen halide or compounds which liberate hydrogen halide during the reaction. It has been found that in this way the number of imidoalkyl groups introduced per aromatic nucleus can be increased.

The copolymers, containing aromatic nuclei, of monovinyl and polyvinyl compounds used in the presence according to the invention are known and can be obtained in known manner. Copolymers of this kind can have both a gel structure and also a macroporous structure. Copolymers of macroporous structure are also known and are described for example in DOS No. 1,745,717. All these copolymers can be used in the present invention.

Copolymers with a predominant content of aromatic monovinyl compounds, such as for example styrene, substituted styrenes (such as vinyl toluene, vinyl anisole, ethyl styrene), vinyl naphthalenes, and a small content of aromatic or aliphatic polyvinyl compounds, are particularly suitable.

The following are given as examples of polyvinyl compounds: divinylbenzene, divinylpyridine, divinyltoluenes, divinylnaphthalenes, diallylphthalate, ethylene glycol diacrylate, ethylene glycol dimethacrylate, divinylxylene, divinylethyl benzene, divinylsulphone, polyvinyl or polyallyl ethers of glycol, glycerin and pentaerythritol, divinylketone, divinylsulphide, allyl acrylate, diallyl maleate, diallyl fumarate, diallyl succinate, diallyl carbonate, diallyl malonate, diallyloxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylene diacrylamide, N,N'-methylene dimethacrylamide, N,N'-ethylene diacrylamide, 1,2-di-(α-methyl methylene sulphonamido)-ethylene, trivinylbenzene, trivinylnaphthalene, polyvinyl anthracenes and trivinyl cyclohexane. Divinylbenzene and trivinylbenzene are preferred.

The size of the polyvinyl compound component acting as crosslinker can fluctuate within wide limits. In the case of copolymers of gel structure, polyvinyl compounds are generally used in quantities of from 0.5 to 20 % by weight and preferably in quantities of from 0.5 to 10 % by weight, whilst, in the case of the macroporous copolymers, the polyvinyl compounds are used in quantities of from 2 to 50 % and preferably in quantities of from 2 to 20 %.

It is also possible to use crosslinked aromatic vinyl copolymers in whose preparation additions of other vinyl compounds have been used, such as for example methacrylic and acrylic compounds, especially acrylonitrile, ethylene, propylene, isobutylene, vinyl chloride, vinyl acetate, vinylidene chloride, vinyl pyridine and substituted vinyl pyridines, also vinyl quinolines and vinyl pyrrolidone. Additions of polyethylenically unsaturated compounds are also suitable, such as isoprene, butadiene, chloroprene, piperylene, pentadiene, hexadiene, octadiene, decadiene, hexatriene, cyclopentadiene and their substitution products, for example chloroprene, 2,3-dimethyl butadiene, 2,5-dimethyl hexadiene, 2,5-dimethyl octadiene, which in general behave as if they only contained one double bond. The additives can be used in any quantities. For the production of anion-exchanging synthetic resins, the use of copolymers, containing more than 50 % per mole, particularly more than 80 % per mole of monomers having aromatics nuclei is preferred.

In general, the N-alkyl ethers of cyclic imides of organic dicarboxylic acids can be used as bis-(dicarbonimidoalkyl)-ethers in the process according to the invention. The following are given as examples of suitable dicarboxylic acids: phthalic acid; diglycolic acid, succinic acid, maleic acid and glutaric acid.

The following are given as examples of corresponding N-alkyl ethers: bis-(succinimidomethyl)-ether, bis-(phthalimido-methyl)-ether, bis-(diglycolimidomethyl)-ether.

The swelling agents used are known, for example halogenated hydrocarbons are suitable. Of these, the following are mentioned in particular: ethylene chloride, methylene chloride, carbon tetrachloride, symmetrical tetrachloroethane, trichloroethylene, tetrachloroethylene, dichloropropane, pentachloroethane, trichloropropanes; tetrachloropropanes, tetrachloroethylene and mixtures thereof.

Suitable catalysts include any compounds known generally as Friedel-Crafts catalysts: these are known. Preferred catalysts are compounds of the kind known as Lewis acids. The following are given by way of example: iron (III) chloride, tin (IV) chloride, zinc chloride and zinc bromide. In addition, it is also possible, in cases where hydrogen halides are added, to use as catalysts compounds of the kind which are converted into the corresponding halides by a hydrogen halide. Compounds of zinc and iron, especially zinc oxide, zinc carbonate and iron (III) oxide, are given as examples of compounds of this kind.

Reaction of the copolymers with bis-(dicarbonimidoalkyl)-ethers is generally carried out by reacting the copolymer in the presence of the swelling agent and the Friedel-Crafts catalyst at temperatures of from 30° to 180°C, preferably at temperatures of from 40° to 150°C, more particularly at the boiling temperature of the particular swelling agent used, optionally with addition of hydrogen halide, until the elimination of water is over. The bis-(dicarbonimidoalkyl)-ethers are used in quantities of from 1 to 8 mols and preferably in quantities of from 1.5 to 5 mols for every 2 mols of aromatic nucleus present in the copolymer. The Friedel-Crafts catalyst is generally used in a quantity of from 2 to 50 % by weight, based on the total quantity of polymer, quantities of from 4 to 20 % preferably being used.

Hydrogen halide can be added by directly introducing the hydrogen halide into the reaction mixture of copolymer, Friedel-Crafts catalyst, swelling agent and bis-(dicarbonimidoalkyl)-ether, or by adding to the reaction mixture compounds which liberate hydrogen halide, such as for example thionyl chloride, sulphuryl chloride or silicon tetrachloride. The hydrogen halide is not added in equimolar quantities, based on the quantity of reacted bis-(dicarbonimidoalkyl)-ether, instead it is always added in less than the equimolar necessary quantity both in the case of direct addition and also in the case of indirect addition in the form of compounds liberating hydrogen halide. The hydrogen halide is generally added in quantities of from 0.1 to 0.75 mol per mol of bis-(dicarbonimidoalkyl)-ether reacted, quantities of from 0.2 to 0.5 mol being preferred.

The imidoalkyl derivatives formed as intermediate stage are hydrolysed by known methods, for example by alkaline or acid hydrolysis, by reaction with hydrazine followed by acid hydrolysis in the presence or absence of solvents or swelling agents. For hydrolysis, the intermediate product can be separated off from the reaction medium, for example by filtration under suction, washing with the swelling agents, in order to remove excess catalyst and N-alkyl ether. If necessary, the isolated product can be dried or washed with an organic solvent which is miscible with water, such as methanol, ethanol, dioxan, tetrahydrofuran. The isolated product is subsequently hydrolysed in an autoclave at temperatures of from 100° to 250°C with an approximately 5 to 40 % aqueous or alcoholic solution of an alkali, such as sodium hydroxide, potassium hydroxide, or with an approximately 5 to 80 % aqueous solution of a mineral acid such as for example hydrochloric acid, hydrobromic acid, sulphuric acid. On the other hand, the intermediate product can also be reacted with a 5 to 50 % aqueous or alcoholic solution of hydrazine hydrate at temperatures of from 50° to 100°C. In a preferred embodiment, this solution can contain other alkalis, especially caustic alkalis, in quantities of from 1 to 20 %. The reaction product can be isolated, washed with water and subsequently heated with an aqueous solution of mineral acid (5 to 20 %) to complete hydrolysis.

The aminoalkyl compounds prepared in accordance with the invention are weak base anion exchange resins with primary amino groups. The application of so obtained anion exchange resins in the field of water treatment is well-known and for example described by R. Kunin and R.J. Myers in Ion Exchange Resins, J. Wiley & Sons, Inc. New York, 1951, Chapter 8). Alkylating of so obtained weak base anion exchange resins in a well-known manner with formaldehyde/formic acid leads to weak base anion exchange resins with tertiary amino groups. The application of so obtained anion exchange resins is known too eg. described in G.A. Cristy, R.E. Lembcke, Chem. Eng. Progr. 44 (1948) 417. Alkylation of the aminoalkyl compounds prepared in accordance with the invention with alkylating agents for example methyl-, ethyl-, propyl-chlorides and -bromides, dialkyl sulphates, alkylene oxides, halogen hydrins, polyhalogen compounds, epihalogydrins, ethylene imines, leads to strong basic anion exchange resins with quaternary amonium groups. The application of these anion exchange resins is well-known too eg. described by U.S. Pat. No. 2,578,937.

The following Table shows the results obtained with a few catalyst systems with and without the addition of hydrogen halide or hydrogen halide donors, 50 g of crosslinked styrene bead polymer (crosslinked with 2,4 and 6 % of divinylbenzene), 400 g of dichlorethane, 200 g of bis-(phthalimidomethyl)-ether and 5 g of catalyst being used in each instance. The procedure adopted was as follows: The styrene bead polymer was steeped in dichloroethane and subsequently heated for 20 hours to boiling point with the addition of bis-(phthalimidomethyl)-ether and the particular catalyst, the water formed during condensation being removed from the system. After cooling, the reaction liquid was filtered off under suction and the beads washed with ethylene chloride. After the ethylene chloride had been driven off with steam, the beads were heated for 6 hours to 80°–90°C with 300 ml of water, 200 g of hydrazine hydrate and 100 ml of 45 % sodium hydroxide solution, subsequently suction-filtered and then heated for 6 hours to 90°C with 500 ml of 15 % hydrochloric acid. After the phthalhydrazine formed had been washed out with dilute sodium hydroxide, the anion exchanger resin was washed until neutral in a filter tube.

The number of imidoalkyl groups introduced per aromatic nucleus without the addition of hydrogen halide is given in column I, whilst the number of imidoalkyl groups introduced per aromatic nucleus where hydrogen halide is added is given in column II.

Table

| Degree of crosslinking of the polystyrene (% DVB) | Catalyst | Imidoalkyl groups per aromatic nucleus Process I | Imidoalkyl groups per aromatic nucleus Process II | Hydrogen chloride g | Hydrogen chloride type |
| --- | --- | --- | --- | --- | --- |
| 2 | FeCl₃ | 2.01 | 2.25 | 3 | HCl |
| 2 | Fe₂O₃ | — | 2.15 | 3 | HCl |
| 2 | ZnO | — | 1.98 | 3 | HCl |
| 2 | SnCl₄ | 0.97 | 1.65 | 3 | HCl |
| 4 | FeCl₃ | 1.43 | 1.74 | 3 | HCl |
| 6 | FeCl₃ | 0.8 | 1.15 | 5 | SOCl₂ |
| 6 macroporous | SnCl₄ | 0.45 | 0.75 | 4 | HCl |

EXAMPLE 1

100 g of a styrene bead polymer crosslinked with 2 % of divinylbenzene were steeped in 600 ml of ethylene chloride. Following the addition of 170 g of di-phthalimidomethyl ether and 10 g of iron (III) chloride, the mixture was heated to reflux, the water formed during the condensation reaction being removed from the system. After refluxing for 10 hours, 10 ml of water had been removed. After cooling, the reaction liquid was filtered under suction and the beads washed twice with ethylene chloride. After the ethylene chloride had been driven off with steam, the beads were heated for 6 hours to 80°–90°C with 300 ml of water, 200 g of hydrazine hydrate and 100 ml of 45 % sodium hydroxide solution, subsequently filtered under suction and then heated for 6 hours to 90°C with 500 ml of 15 % hydrochloric acid. After the phthalhydrazide formed had been washed out with dilute sodium hydroxide and then with water, 400 ml of an anion exchanger were obtained which had an acid binding capacity of 2.5 val/l with respect to n/10 HCl.

EXAMPLE 2

100 g of a styrene bead polymer crosslinked with 4 % of divinylbenzene were steeped in 500 ml of ethylene chloride and further treated as described in Example 1 following the addition of 170 g of di-phthalimidomethyl ether and 10 g of iron (III) chloride.

350 ml of an anion exchanger were obtained which had an acid-binding capacity of 2.8 val/l with respect to n/10 HCl.

EXAMPLE 3

The treatment described in Example 2 of 100 g of a styrene bead polymer crosslinked with 4 % of divinylbenzene and 2 % of hexadiene-1,5 gave 320 ml of an anion exchanger with an acid binding capacity of 3.0 val/l with respect to n/10 hydrochloride acid.

EXAMPLE 4

The treatment described in Example 2 of 100 g of a styrene bead polymer crosslinked with 6 % of divinylbenzene gave 320 ml of an anion exchanger with an acid-binding capacity of 3.0 val/l with respect to n/10 hydrochloric acid.

EXAMPLE 5

100 g of a styrene bead polymer crosslinked with 2 % of divinylbenzene was steeped in 600 ml of ethylene chloride. Following the addition of 170 g of di-phthalimidomethyl ether and 40 g of tin (IV) chloride, the product was further processed as described in Example 1. 400 ml of an anion exchanger with an acid-binding capacity of 2.4 val/l with respect to n/10 hydrochloric acid were obtained.

EXAMPLE 6

The procedure is as in Example 5, except that 50 g of 98 % sulphuric acid were used instead of tin (IV) chloride. 370 ml of an anion exchanger were obtained with an acid-binding capacity of 1.8 val/l with respect to n/10 hydrochloric acid. Where toluene sulphonic acid was used instead of sulphuric acid, an anion exchanger (250 ml) with an acid-binding capacity of 1.6 val/l with respect to n/10 hydrochloric acid was obtained.

EXAMPLE 7

100 g of a styrene bead polymer crosslinked with 2 % of divinylbenzene were steeped in 600 ml of ethylene chloride and, following the addition of 340 g of di-phthalimidomethyl ether and 20 g of iron (III) chloride, were heated for 10 hours to reflux, the water formed (19 ml) being removed from the system. After cooling, the reaction liquid was filtered under suction and the beads washed once with ethylene chloride. After the ethylene chloride had been driven off with steam, the beads were heated for 8 hours to 80°–90°C with 500 ml of water, 200 g of hydrazine hydrate and 200 ml of 45 % sodium hydroxide solution, subsequently filtered under suction and then heated for 8 hours to 90°C with 600 ml of 15 % hydrochloric acid. After the phthalhydrazide precipitated had been washed out with dilute sodium hydroxide and then with water, 600 ml of an anion exchanger with an acid-binding capacity of 3.2 val/l were obtained.

EXAMPLE 8

100 g of crosslinked macroporous styrene bead polymer crosslinked with 6 % of divinylbenzene (prepared by the bead polymerisation of styrene-divinylbenzene in the presence of 70 % of isododecane, based on the monomer content) were steeped in 500 ml of ethylene chloride and then further treated as described in Example 1 following the addition of 170 g of di-phthalimidomethyl ether and 10 g of iron (III) chloride. 490 ml of an anion exchanger with an acid-binding capacity of 2.0 val/l with respect to n/10 hydrochloric acid were obtained.

EXAMPLE 9

100 g of a styrene bead polymer crosslinked with 2 % of divinylbenzene were steeped in 1200 g of 1,2-dichloropropane and, following the addition of 480 g of di-phthalimidomethyl ether and 20 g of iron (III) chloride, were heated for 18 hours, to reflux, 19 ml of water being removed from the system. Further working up as described in Example 7 gave 680 ml of an anion exchanger with an acid-binding capacity of 3.3 val/l with respect to n/10 hydrochloric acid.

EXAMPLE 10

100 g of a styrene bead polymer crosslinked with 12 % of divinylbenzene were steeped in 800 g of 1,2-dichloropropane and, following the addition of 150 g of diphthalimidomethyl ether and 10 g of iron (III) chloride, were heated for 20 hours to reflux. 8 ml of water being removed from the circuit. The reaction product was washed twice with 1,2-dichloropropane, stirred with 10 % of ammonia water and the dichloropropane removed by distillation with steam. The reaction product was then heated for 16 hours to 160°C in an autoclave with 30 % sodium hydroxide solution and subsequently washed with water on a filter until it showed a neutral reaction. The 240 ml of anion exchanger thus obtained had an acid-binding capacity of 2.3 val/l with respect to n/10 hydrochloric acid.

EXAMPLE 11

The treatment described in Example 10 of 100 g of a styrene bead polymer crosslinked with 18 % of divinylbenzene gave 200 ml of an anion exchanger with an acid-binding capacity of 0.9 val/l with respect to n/10 hydrochloric acid.

EXAMPLE 12

The treatment described in Example 10 of 100 g of a p-vinyl toluene bead polymer crosslinked with 15 % of divinylbenzene gave 230 ml of an anion exchanger with an acid-binding capacity of 1.0 val/l with respect to n/10 hydrochloric acid.

EXAMPLE 13

500 g of a macroporous styrene bead polymer crosslinked with 10 % of divinylbenzene (prepared by the bead polymerisation of styrene-divinylbenzene in the presence of 90 % of white spirit, based on the weight of the monomers) were steeped in 2600 ml of ethylene chloride and, following the addition of 700 g of diphthalimidomethyl ether and 50 g of iron (III) chloride, were heated for 12 hours to reflux during which 33 ml of water were removed from the circuit. The reaction product was washed twice with ethylene chloride, stirred with 10 % ammonia water and the ethylene chloride removed by distillation with steam. Further working up in accordance with Example 9 gave 1500 ml of an anion exchanger with an acid-binding capacity of 2.5 val/l with respect to n/10 hydrochloric acid.

EXAMPLE 14

The treatment described in Example 13 of 500 g of a macroporous styrene bead polymer crosslinked with 8 % of trivinylbenzene (prepared by the bead polymerisation of styrene-trivinylbenzene in the presence of 90 % of white spirit, based on the weight of the monomers) gave 1600 ml of an anion exchanger with an acid-binding capacity of 2.5 val/l with respect to n/10 hydrochloric acid.

EXAMPLE 15

100 g of a macroporous ethyl styrene-bead polymer crosslinked with 50 % of divinylbenzene (prepared by the bead polymerisation of ethyl styrene-divinylbenzene in the presence of 100 % of isododecane, based on the weight of the monomers) were steeped in 500 ml of methylene chloride and heated for 24 hours to reflux following the addition of 50 g of diphthalimidomethyl ether and 10 g of tin(IV) chloride. After washing with methylene chloride, the methylene chloride was driven off with steam and the reaction product hydrolysed with hydrazine hydrate and sodium hydroxide as in Example 1. The 400 ml of anion exchanger thus obtained had an acid-binding capacity of 0.35 val/l with respect to n/10 hydrochloric acid.

EXAMPLE 16

100 g of a macroporous styrene bead polymer crosslinked with 2 % of divinylbenzene (prepared by the bead polymerisation of a mixture of styrene-divinylbenzene in which linear polystyrene of molecular weight 180,000 had been dissolved in a quantity of 20 % of the monomer mixture and which was extracted with tetrahydrofuran on completion of polymerisation) were steeped in 500 ml of dichloroethane. 170 g of diphthalimido-methyl ether and 10 g of iron (III) chloride were added and the mixture heated for 12 hours to reflux during which 8 ml of water were removed from the system. The reaction mixture was then washed with dichloroethane, stirred with 10 % of ammonia water and freed from the dichloroethane by distillation with steam. After the reaction product had been hydrolysed by heating for 16 hours to 160°C in 25 % sodium hydroxide solution, 380 ml of an anion exchanger with an acid-binding capacity of 2.4 val/l with respect to n/10 hydrochloric acid were obtained.

EXAMPLE 17

50 g of a styrene bead polymer crosslinked with 2 % of divinylbenzene were steeped in 400 ml of dichloroethane. Following the addition of 200 g of bis-(phthalimidomethyl)-ether and 5 g of iron (III) chloride, the product was heated to reflux, 3 g of hydrogen chloride being introduced into the reaction mixture in three portions over a period of 6 hours. At the same time, the water formed during condensation was removed from the system. 19 ml of water were removed over a period of 10 hours.

After cooling, the reaction liquid was filtered under suction and the beads washed twice with ethylene chloride. After the ethylene chloride had been driven off with steam, the beads were heated for 6 hours to 80°-90°C with 300 ml of water, 200 g of hydrazine hydrate and 100 ml of 45 % sodium hydroxide solution, subsequently suction filtered and then heated for 6 hours to 90°C with 500 ml of 15 % hydrochloric acid. After the phthalhydrazide formed had been washed out with dilute sodium hydroxide and water, 340 ml of an anion exchanger were obtained which had an acid-binding capacity of 3.2 val/l with respect to n/10 hydrochloric acid.

EXAMPLE 18

The procedure was as in Example 17 except that no hydrogen chloride was introduced. 300 ml of an anion exchanger with an acid-binding capacity of 3.2 val/l with respect to n/10 HCl were obtained.

EXAMPLE 19

50 g of a styrene bead polymer crosslinked with 2 % of divinylbenzene were steeped in 400 ml of dichloromethane. Following the addition of 200 g of bis- (phthalimidomethyl)-ether and 5 g of iron (III) oxide, the product was heated to reflux, 7 g of hydrogen chloride being introduced over a period of 10 hours. The water formed during condensation was removed from the system. After cooling, the reaction liquid was filtered under suction and the beads washed twice with ethylene chloride. Further working up was carried out as in Example 1, giving 320 ml of an anion exchanger with an acid-binding capacity of 3.2 val/l with respect to n/10 HCl.

Where iron (III) oxide was used as catalyst, no conversion was obtained without the introduction of hydrogen chloride.

EXAMPLE 20

The procedure was as in Example 17, except that 6 g of zinc oxide was used as catalyst instead of iron (III) chloride. The quantity of hydrogen chloride introduced amounted to 8 g. 325 ml of an anion exchanger were obtained with an acid-binding capacity of 2.9 val/l with respect to n/10 HCl. No reaction occurred where the test was carried out without hydrogen chloride.

EXAMPLE 21

50 g of a styrene bead polymer crosslinked with 2 % of divinylbenzene were steeped in 400 ml of ethylene chloride. Following the addition of 200 g of bis-(phthalimidomethyl)-ether and 5 g of tin (IV) chloride, the product was heated to reflux, 3 g of hydrogen chloride being introduced into the reaction mixture over a period of 6 hours. The water formed during condensation was removed from the system. After cooling, the reaction liquid was filtered under suction and the beads washed twice with ethylene chloride. The reaction product was worked up in the same way as in Example 17. 270 ml of an anion exchanger with an acid-binding capacity of 2.9 val/l with respect to n/10 HCl were thus obtained.

When this test was carried out without introducing hydrogen chloride, 195 ml of an anion exchanger with an acid-binding capacity of 2.3 val/l were obtained.

EXAMPLE 22

The reaction of 50 g of a styrene bead polymer crosslinked with 4 % of divinylbenzene in 400 ml of dichloroethane with 200 g of bis-(phthalimidomethyl)-ether and 5 g of iron (III) chloride, in accordance with the procedure of Example 17, gave 230 ml of an anion exchanger with an acid-binding capacity of 3.6 val/l with respect to n/10 HCl. When condensation was carried out without the introduction of hydrogen chloride, 190 ml of an anion exchanger with an acid-binding capacity of 3.55 val/l were obtained.

EXAMPLE 23

100 g of a macroporous styrene polymer crosslinked with 6 % divinylbenzene (obtained in known manner by the bead polymerisation of styrene and divinylbenzene in the presence of 70 % of isododecane, based on the weight of the monomers), were steeped in 400 ml of ethylene chloride and heated to reflux following the addition of 200 g of bis-(phthalimidomethyl)-ether and 15 g of tin (IV) chloride. 5 g of thionyl chloride dissolved in 50 g of dichloroethane were added dropwise at a uniform rate over a period of 6 hours and the water formed during condensation removed from the system. The reaction product was then heated for 16 hours to 165°C in an autoclave with 25 % sodium hydroxide and washed neutral with water after cooling. 330 ml of an anion exchanger with an acid-binding capacity of 1.42 val/l with respect to n/10 HCl were thus obtained.

When the test is carried out without the dropwise addition of thionyl chloride, 320 ml of an anion exchanger with an acid-binding capacity of 1.3 val/l with respect to n/10 HCl were obtained.

EXAMPLE 24

25 g of a macroporous styrene polymer crosslinked with 5 % of divinylbenzene (obtained as known per se by the bead polymerisation of styrene and divinylbenzene in the presence of 63 % of isododecane, based on the weight of the monomers), were steeped in 500 ml of dichloroethane. Following the addition of 30 g of bis-(succinimidomethyl)-ether and 5 g of iron (III) chloride, the product was heated to reflux for a total of 24 hours, a total of 1.2 g of hydrogen chloride being introduced into the reaction mixture in several small portions over a peroid of 12 hours. The water formed during condensation was removed from the system. After cooling, the reaction liquid was filtered under suction and the beads washed with dichloroethane. After the dichloroethane had been driven off, the reaction product was heated for 8 hours to 180°C in 200 ml of 20 % hydrochloric acid and then washed until neutral with 500 ml of water, 300 ml of 5 % sodium hydroxide and then with another 230 ml of water. 67 ml of an anion exchanger with an acid-binding capacity of 2.1 val/l with respect to n/10 HCl were obtained.

What is claimed is:

1. A process for the preparation of a synthetic resin which has anion-exchanging properties which comprises condensing a crosslinked copolymer which contains aromatic nuclei and is a copolymer of at least one monovinyl compound and at least one polyvinyl compound, with at least one bis-(dicarbonimidomethyl)-ether in the presence of a catalytic amount of a Friedel-Crafts catalyst and hydrolyzing resulting condensation product.

2. The process as claimed in claim 1 in which the product obtained after hydrolysis is alkylated.

3. The process as claimed in claim 1 in which the condensation is carried out in a liquid which is capable of swelling the copolymer.

4. The process as claimed in claim 1 in which said condensation is carried out in the presence of a small quantity of hydrogen halide.

5. The process as claimed in claim 4 in which the product obtained after hydrolysis is alkylated.

6. The process as claimed in claim 4 in which the condensation is carried out in a liquid which is capable of swelling the copolymer.

7. The process as claimed in claim 4 in which said hydrogen halide is introduced into, or produced in situ, in the reaction mixture during condensation.

8. The process as claimed in claim 4 in which the Friedel-Crafts catalyst is a halide which is produced in situ by the action of hydrogen halide.

9. The process as claimed in claim 8 in which the Friedel-Crafts catalyst is produced by reaction of hydrogen halide with ferric oxide.

10. The process as claimed in claim 4 in which the hydrogen halide is produced in the reaction mixture by decomposition of a hydrogen halide donor.

11. The process as claimed in claim 1 in which the Friedel-Crafts catalyst used is a Lewis acid.

12. The process as claimed in claim 1 in which the copolymer used is a copolymer of styrene and divinyl benzene.

13. The process as claimed in claim 1 in which the bis-(dicarbonimidoalkyl)-ether is a bis-(phthalimidomethyl)-ether.

14. The process as claimed in claim 1 in which the bis-(dicarbonimidoalkyl)-ether is bis-(succinimidomethyl)-ether.

15. The process as claimed in claim 1 in which the bis-(dicarbonimidoalkyl)-ether is bis-(diglycolimidomethyl)-ether.

* * * * *